United States Patent [19]

Hayashi et al.

[11] Patent Number: 5,062,124
[45] Date of Patent: Oct. 29, 1991

[54] NETWORK SYNCHRONIZATION SYSTEM

[75] Inventors: Shigehiro Hayashi, Owariasahi; Yoshibumi Ayukawa, Kawasaki, both of Japan

[73] Assignee: Fujitsu Limited, Kawasaki, Japan

[21] Appl. No.: 401,767

[22] Filed: Sep. 1, 1989

[30] Foreign Application Priority Data

Sep. 1, 1988 [JP] Japan .................. 63-216392

[51] Int. Cl.$^5$ .................. H04L 7/00
[52] U.S. Cl. .................. 375/107; 455/51
[58] Field of Search .................. 375/109, 107, 120; 455/69, 51; 358/149; 331/1 R, 1 A; 370/103; 342/73, 82, 83, 84, 88

[56] References Cited

U.S. PATENT DOCUMENTS 3,311,702  3/1967  Legler .................. 358/149
3,804,992  4/1974  Fiorino et al. .................. 375/120
3,862,365  1/1975  Kobayashi et al. .................. 455/51

FOREIGN PATENT DOCUMENTS 63-4732  1/1988  Japan .

Primary Examiner—Stephen Chin
Attorney, Agent, or Firm—Staas & Halsey

[57] ABSTRACT

A network synchronization system for synchronizing a master clock in a distributed communication system composed of a plurality of communication devices interconnected by one or more transmission lines, with a reference clock supplied from outside. A phase difference obtaining circuit for obtaining a phase difference between the reference clock and a master clock in the distributed communication system, is provided in a first communication device of the plurality of communication devices, and the phase difference is transmitted from the first communication device to a second communication device through the transmission line. The second communication device comprises a controlled oscillator circuit for receiving the phase difference, and outputting a master clock having a phase which is controlled according to the output of the phase difference obtaining circuit, so that the phase of the master clock is synchronized with the phase of the reference clock.

4 Claims, 5 Drawing Sheets

NETWORK SYNCHRONIZATION SYSTEM

BACKGROUND OF THE INVENTION

1. Field of the Invention

The present invention relates to a network synchronization system for synchronizing a master clock in a distributed communication system composed of a plurality of communication devices interconnected by transmission lines, with a reference clock supplied from outside.

In recent data processing and communicaton systems constructed in a company or in a factory, apparatuses for processing data and carrying out communications are decentralized to disperse the functions, loads, and risks. Further, to transmit various kinds of information including, for example, sound signals, image signals, and the like, a fast and large-capacity data transmission equipment with a very high transmission rate is required.

To realize a communication system for carrying out a fast and large-capacity data transmission between a plurality of communication devices, the FDDI (Fiber Distributed Data Interface) standard is now under preparation by the ANSI (American National Standards Institute). In particular, in the FDDI-II, a standardization of a high-speed and large-capacity multimedia backbone LAN (local area network) wherein asynchronous communications such as a packet communication and synchronous communications for transmitting sound signals, image signals, and the like, are carried out, is under preparation.

In synchronous communications system, if the frequencies of the operating clocks on the receiver side and the sender side are not the same, errors such as a clock slip, missing data, or the like, occur on the receiver side due to the frequency difference, and therefore, the frequencies of the operating clocks in all of the communication devices in a communication system must be synchronized with a master clock.

Further, to realize a communication between the communication devices in different communication systems, connected to each other, a phase synchronization between the operating clocks in the communication devices in the different communication systems is required.

Furthermore, if the above communication systems are connected through a public digital communication network, the operating clocks in the above communication devices in the different communication systems must be synchronized with the operating clock of the public digital communication network.

In the above situation, generally, an improvement in the technique for synchronizing all of the communication devices in a communication system with a reference clock supplied from outside, is required.

2. Description of the Related Art

FIG. 1 shows a conventional construction for synchronizing communication devices in a ring-type LAN connected to a public digital communication network, with a reference clock supplied from the public digital communication network.

The LAN shown in FIG. 1 is constructed by connecting a plurality of communication devices $1_1, 1_2, 1_3, \ldots 1_i, 1_{i+1}, \ldots 1_n$ by a transmission line 2. Note, the scope of the present invention does not limit the type of LAN which, for example, can include a star-type, a bass-type, and a mesh-type LAN.

In the construction of FIG. 1, the communication device $1_2$, serves as a synchronization control apparatus, i.e., a clock master apparatus. The synchronization control apparatus $1_2$, supplies a master clock to all of the other communication devices in the LAN, and contains an oscillator 82 which outputs the master clock, where the phase of the master clock is controllable.

On the other hand, the LAN is connected to the above-mentioned public digital communication network through a time-divisional multiplexing unit (TDM) 122 and a high-speed digital line terminal unit (digital service unit, DSU) 121.

The above-mentioned public digital communication network supplies timing information, i.e., clock information of, for example, 64 kbps+8 kbps, as timings of data transmission, and the clock timing is extracted at the time-divisional multiplexing unit (TDM) 122 as a timing signal of data reception.

Generally, the above LAN is connected to the public digital communication network at one of the communication devices of the LAN. In particular, if the communication device at which the LAN is connected to the public digital communication network, is different from the above synchronization control apparatus, as shown in FIG. 1, the above-extracted reference clock must be drawn over from the time-divisional multiplexing unit (TDM) 122 to the synchronization control apparatus $1_2$, through a transmission line 200 provided for supplying only the reference clock.

Although not shown in FIG. 1, the synchronization control apparatus in FIG. 1 includes a PLL circuit wherein the phases of the above reference clock and the master clock output from the above-mentioned oscillator 82 are compared, and the phase of the output of the oscillator 82 is controlled according to the comparison result so that the phase of the master clock is synchronized with the phase of the reference clock.

The above provision of the transmission line 200, however, increases costs. In particular, in a communication system extending over a large area, a distance between adjacent communication devices is often a few kilometers, and therefore, in a communication system wherein the distance between adjacent communication devices is large, the above increase in the cost is considerable.

Furthermore, if a stand-by line is provided against a possible break down of the transmission line 200, the cost is further increased.

In particular, in a completely distributed system, wherein all communication devices can be a clock master apparatus, the above-mentioned reference clock must be supplied to all of the communication devices except the communication device at which the LAN is connected to the public digital communication network. In practice, this is impossible, and therefore, a completely distributed system cannot be constructed due to the above problem.

SUMMARY OF THE INVENTION

An object of the present invention is to provide a network synchronization system for synchronizing a master clock in a distributed communication system comprised of a plurality of communication devices interconnected by one or more transmission lines, with a reference clock supplied from outside, which requires less equipment, and therefore, is lower in cost.

According to the present invention, there is provided a network synchronization system for synchronizing a master clock in a distributed communication system comprised of a plurality of communication devices interconnected by one or more transmission lines, with a reference clock supplied from outside, wherein a first communication device of the plurality of communication devices comprises a phase difference obtaining means for obtaining a phase difference between the reference clock and a master clock in the distributed communication system; and a second communication device of the plurality of communication devices comprises a controlled oscillator means for receiving the output of the phase difference obtaining means through the transmission line connecting the first and second communication devices, and outputting a master clock having a phase of which is controlled according to the output of the phase difference obtaining means so that the phase of the master clock is synchronized with the phase of the referecne clock.

DESCRIPTION OF THE PREFERRED EMBODIMENTS

Before describing the preferred embodiment of the present invention, the basic principle of the present invention is explained below.

Figure 2:
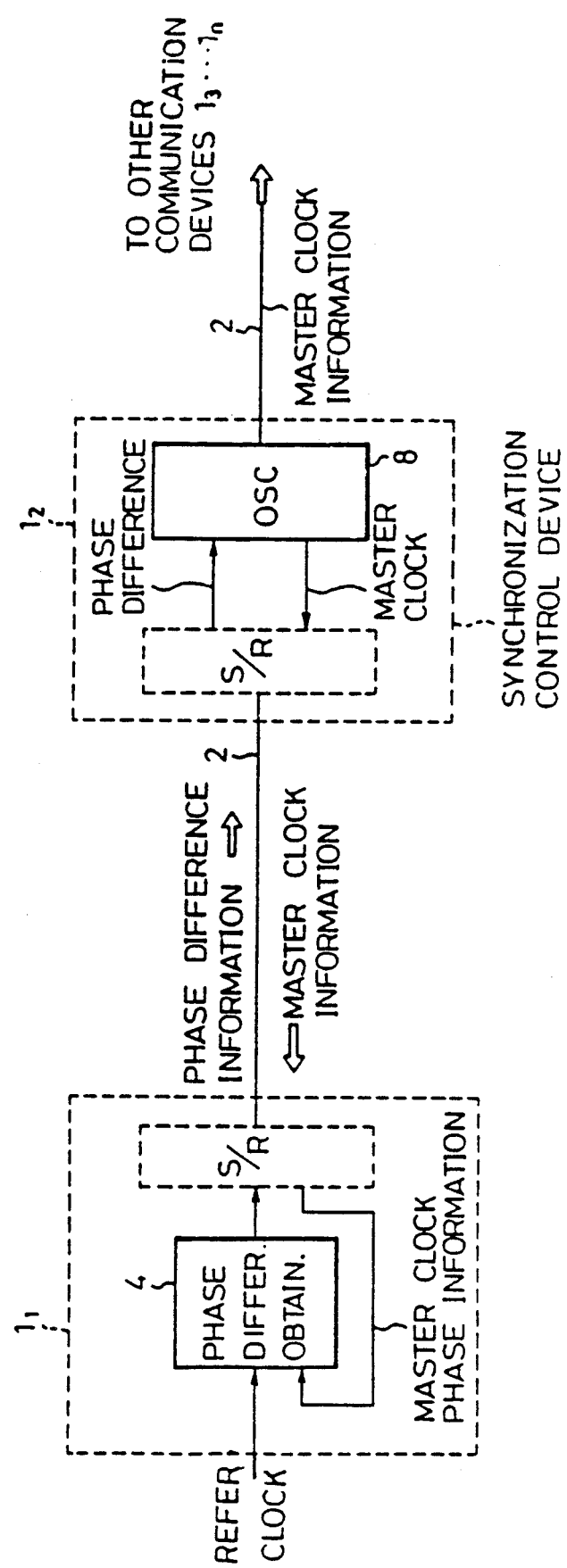
FIGS. 2 and 3 show a basic construction of the present invention.

FIG. 2 shows a basic construction to the present invention.

In Fig. 2, reference numerals $1_1$ and $1_2$ each denote a communication device, 2 denotes a transmission line, 4 demotes a phase difference obtaining means, and 8 denotes a controlled oscillator means.

FIG. 2 shows a part of the construction of a distributed communication system comprised of a plurality of communication devices $1_1, 1_2, 1_3, \ldots 1_i, 1_{i+1}, \ldots 1_n$ interconnected by a transmission line 2.

The communication device $1_1$ is located near a position of which a reference clock can be extracted without providing a transmission line for transmitting the reference clock, and is supplied with the reference clock. The communication device $1_2$ comprises a controlled oscillator means 8 which generates a clock having a phase which can be controlled, as a master clock.

The communication device $1_1$ comprises a phase difference obtaining means 4. When the reference clock is input to the communication device $1_1$, in addition, information of the master clock generated in the controlled oscillator means 8 is also obtained through the transmission line 2 from the communication device $1_2$. The phase difference obtaining means 4 compares the phases of the master clock and the reference clock, and obtains information on the phase difference between the master clock and the reference clock.

On the other hand, the controlled oscillator means 8 in the communication device $1_2$ receives data including the phase difference information through the transmission line 2, as a control input for controlling the phase of the master clock output by the controlled oscillator means 8, and thus, the phase of the master clock is controlled according to the control input so that the phase of the master clock is synchronized with the reference clock.

Figure 1:
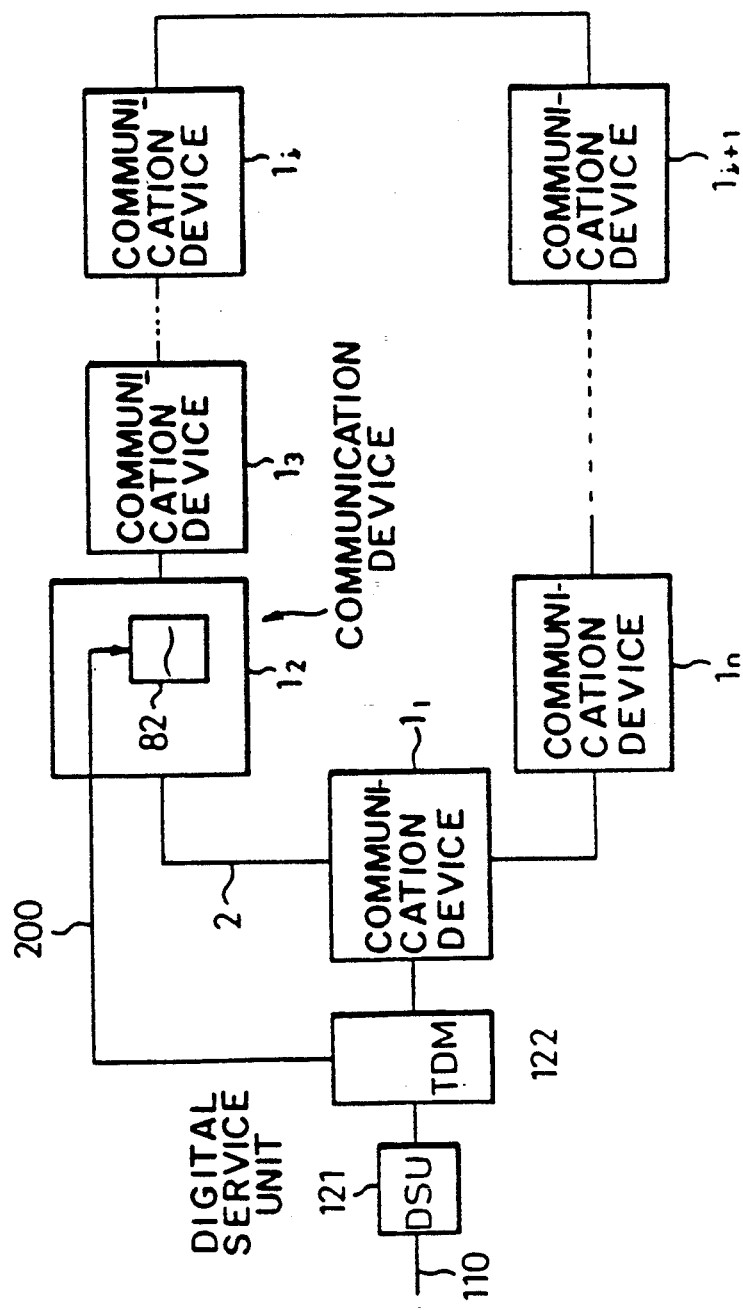
FIG. 1 shows a conventional construction for synchronizing communication devices in a ring-type LAN connected with a public digital communication network, with a reference clock supplied from the public digital communication network.

The construction shown in FIG. 2 can be applied when any communication device in the distributed communicaton system other than the communication device $1_2$ is a synchronization control device (clock master device) which comprises a controlled oscillator means and supplies a master clock to all of the other communication devices in the distributed communication system. Namely, the phase information of the reference clock supplied from outside of the distributed communication system, can be supplied to the synchronization control device by transmitting the phase difference information as data through the originally existing transmission line 2, without providing another transmission line for transmitting the above reference clock phase information to the synchronization control device as shown in FIG. 1, even when a communication device in the distributed communication system other than a communication device $1_2$ is a synchronization control device. Therefore, according to the present invention, the load imposed on the equipment will not change when any communication device is used as the synchronization control device.

The phase difference obtaining means 4 is originally (even in the prior art) necessary for enabling the synchronization control device to obtain the master clock synchronized with the reference clock, although the reference clock is supplied through another transmission line as shown in FIG. 1. In the construction of the present invention, the phase difference obtaining means 4 is located in the communication device $1_1$, which receives the reference clock and not the synchronization control device, instead of the communication device $1_2$. This relocation of the phase difference obtaining means 4 does not increase the total amount of equipment required, and therefore, does not increase the total cost.

Since the above-mentioned master clock phase information can be transmitted from the synchronization control device to the other communication devices in the distributed communication system, as a timing of data transmitted from the synchronization control device to the other communication devices, the transmission of the master clock phase information does not impose a load to the distributed communication system.

Since the phase difference information transmitted from the communication device $1_1$ to the synchronization control device (communication device $1_2$) is difference data, the amount of information is not large, and therefore, the phase difference information can be transmitted at a timing synchronized with the master clock, for example, together with the other data, without a problem.

As explained above, according to the present invention, the load imposed on the equipment will not change when any communication device is used as the synchronization control device, and the load imposed on the distributed communication system and the cost of the system will not be increased.

Figure 3:
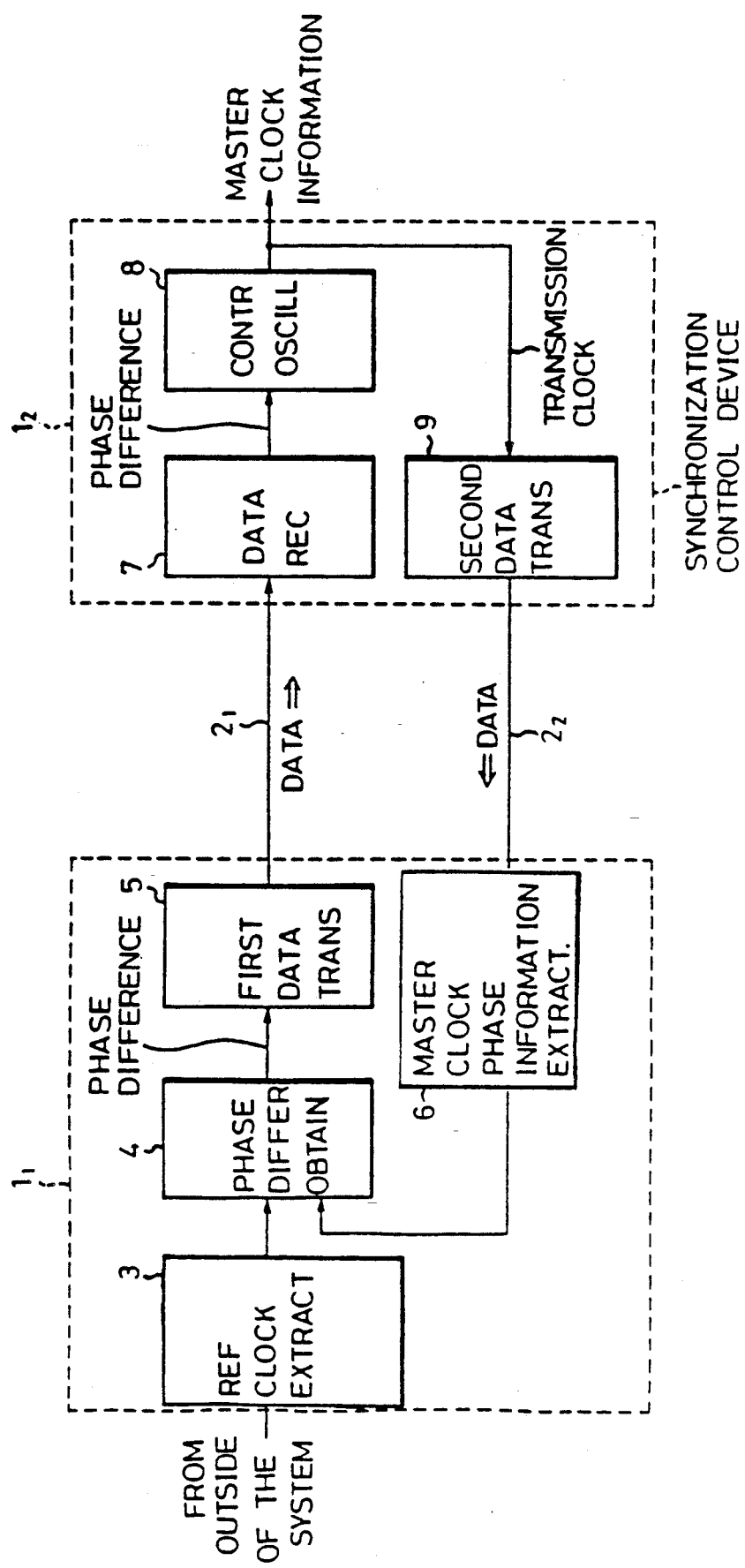

FIG. 3 shows a more detailed construction of the present invention.

In the construction shown in FIG. 3, the communication device $1_1$ comprises, in addition to the above phase difference obtaining means 4, a reference clock extracting means 3, a first data transferring means, and a master clock phase difference obtaining means 6, and the synchronization control device $1_2$ comprises, in addition to the above controlled oscillator means 8, a data receiving means 7, and a second data transmitting means 9.

The reference clock extracting means 3 comprised by the communication device $1_1$ is realized by a timing extracting circuit which extracts a timing of synchronous data transmitted from outside of the distributed communication system, for example, from a public digital network.

The first data transmitting means 5 comprised by the communication device $1_1$ transmits the data, including the phase difference information obtained in the phase difference obtaining means 4, through the transmission line 2 to the synchronization control device $1_2$, in accodance with a procedure determined for general data transmission in the distributed communication system.

For example, the following procedures are applicable: transmitting the phase data periodically at a predetermined position in each frame; transmitting the phase difference data as a response to periodical polling from the synchronization control device $1_2$ to the communication device $1_1$; or the communication device $1_1$ periodically and independently obtains a right of transmission to the synchronization control device, and the transmits the phase difference data.

The master clock phase information extracting means 6 receives synchronous data transmitted in the timing of the master clock from the synchronization control device $1_2$, and extracts the master clock phase information from the receiving timing signal, where the master clock phase information means any information showing the phase of the master clock, for example, a pluse generated from the master clock, a frequency-divided pulse of the master clock, or a receiving clock regenerated from an extracted timing of the transmitted data synchronized with the master clock, and the above synchronous data means any data synchronized with the master clock.

The above-mentioned phase difference data can be the following: a digitized value obtained by integrating the phase difference detected in the phase difference obtaining means 4 for a predetermined time and digitizing the integration; the number of the leading edges of one of the master clock and the reference clock in a period of a frequency-divided pulse of the other of the master clock and the reference clock; or the difference between the above number and a predetermined number (expectation value).

The data receiving means 7 comprised by the synchronizartion control device $1_2$ receives data transmitted through the transmission line 2 and, for example, can separate bits at a predetermined position in a frame data.

The second data transmitting means 9 in the synchronization control device $1_2$ transmits data using the master clock as a sending clock.

Figure 4:
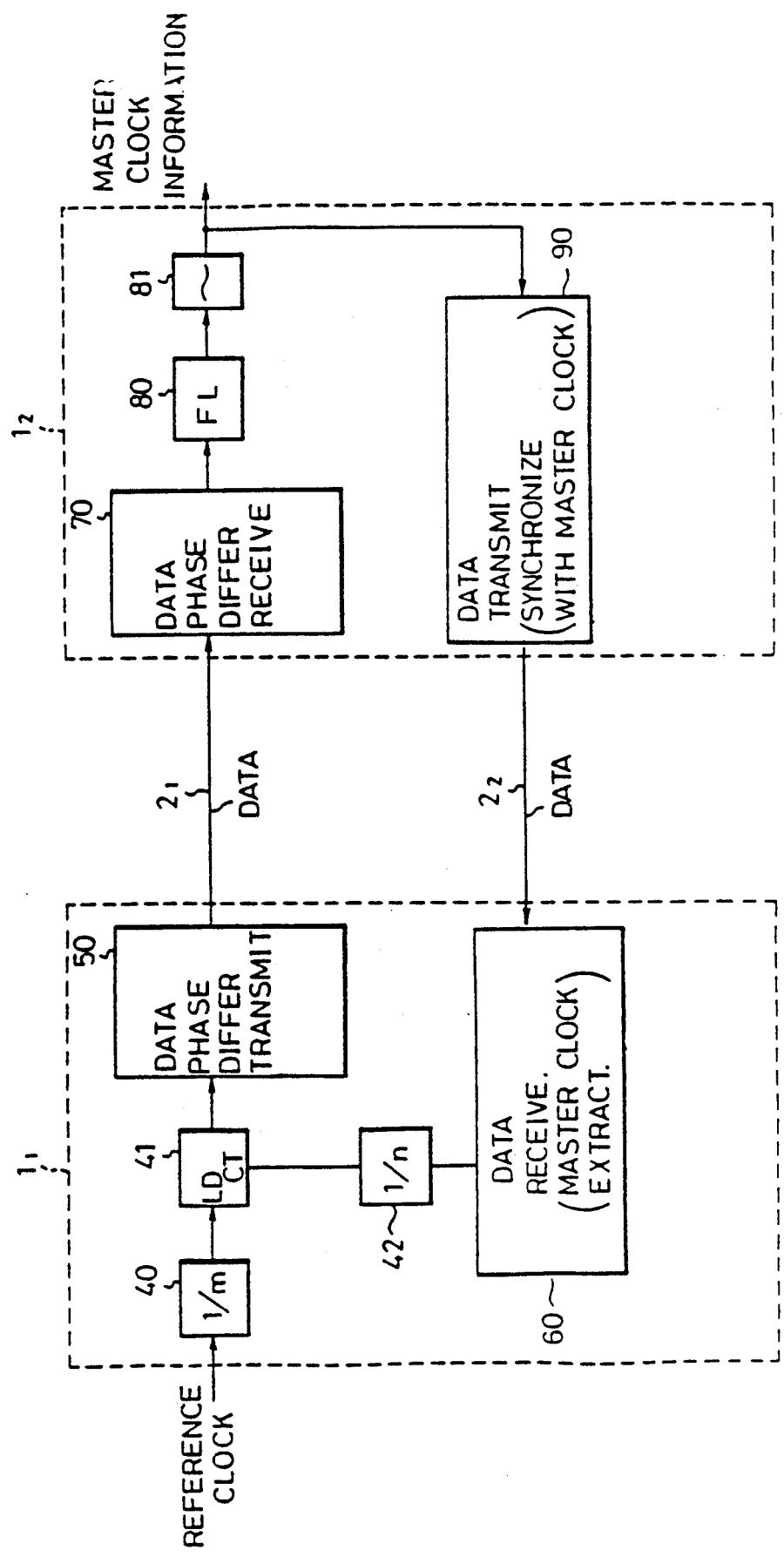
FIGS. 4 and 5 show embodiments of the present invention.

An embodiment of the above construction of FIGS. 2 and 3 is shown in FIG. 4.

In FIG. 4, reference numeral 40 denotes a 1/m frequency dividing circuit, 41 denotes a counter, 42 denotes a 1/n frequency dividing circuit, 80 denotes a filter circuit, 81 denotes a controlled oscillator circuit, 50 and 90 each denote a data transmitting circuit, and 60 and 70 each denote a data receiving circuit.

The above 1/m frequency dividing circuit 40, the i/n frequency dividing circuit, and the counter 41 in the communication device $1_1$ realize the aforementioned phase difference obtaining means 4 in FIGS. 2 and 3, and the data transmitting circuit 50 and the data receiving circuit 60 each realize the aforementioned first data transmitting means 5 and the master clock phase information extracting means 6 in FIG. 3, respectively.

The data receiving circuit 70 and the data transmitting circuit 90 each realize the functions of the aforementioned data receiving means 7 and the second data transmitting means 90 in FIG. 3, and the filter circuit 80 and the controlled oscillator circuit 81 realize the aforementioned controlled oscillator means 8.

The construction corresponding to the reference clock extracting means 3 in FIG. 3 is not shown in FIG. 4.

In the construction of FIG. 4, the above reference clock is 1/m frequency-divided in the 1/m frequency dividing circuit 40, and is then applied to the load input terminal of the counter LD as a reference clock, for a comparsion of the phase. The master clock, which is extracted by the master clock extracting means 6, is 1/n frequency-divided in the 1/n frequency dividing circuit 42, and is then applied to the edge-triggered input terminal of the counter 41. The counter 41 is a two'complement type down counter which counts down the leading edge of the input of the above edge-triggered input terminal for a cycle of the above load input.

When the above load signal from the 1/m frequency dividing circuit 40 is applied to the load terminal LD, the count at that moment is latched in the output stage as phase difference data, and an expectation value of the phase difference is loaded in the counter 41 as an initial value for the next operation for obtaining a phase difference. The phase difference data latched in the output stage of the counter 41 transmitted by the first data transmitting circuit 5 through the transmission line $2_1$ to the communication device $1_2$.

The frequency of the master clock is smaller than the above expectation value when the above phase difference value is positive, or the frequency of the master clock is larger than the above expectation value when the above phase difference value is negative, or the frequency of the master clock is equal to the above expectation value when the above phase difference value is zero.

When positive phase difference data is sent by the data transmitting circuit 50 through the transmission line $2_1$, the data receiving circuit 70, and the filter circuit 80 to the controlled oscillator circuit 81, the frequency of the output of the controlled oscillator circuit 81 is increased, i.e., to advance the phase of its output, or when negative phase difference data is sent to the controlled oscillator circuit 81, the frequency of the output of the controlled oscillator circuit 81 is decreased, i.e., to delay the phase of its output. Thus, the phase of the output of the controlled oscillator circuit 81, i.e., the phase of the master clock, is synchronized with the phase of the aforementioned reference clock.

In addition, the above filter circuit 80 is provided for removing the variation component in the reference clock, and preventing a free-running of the controlled oscillator circuit 81 when the transmission line is broken.

Figure 5:
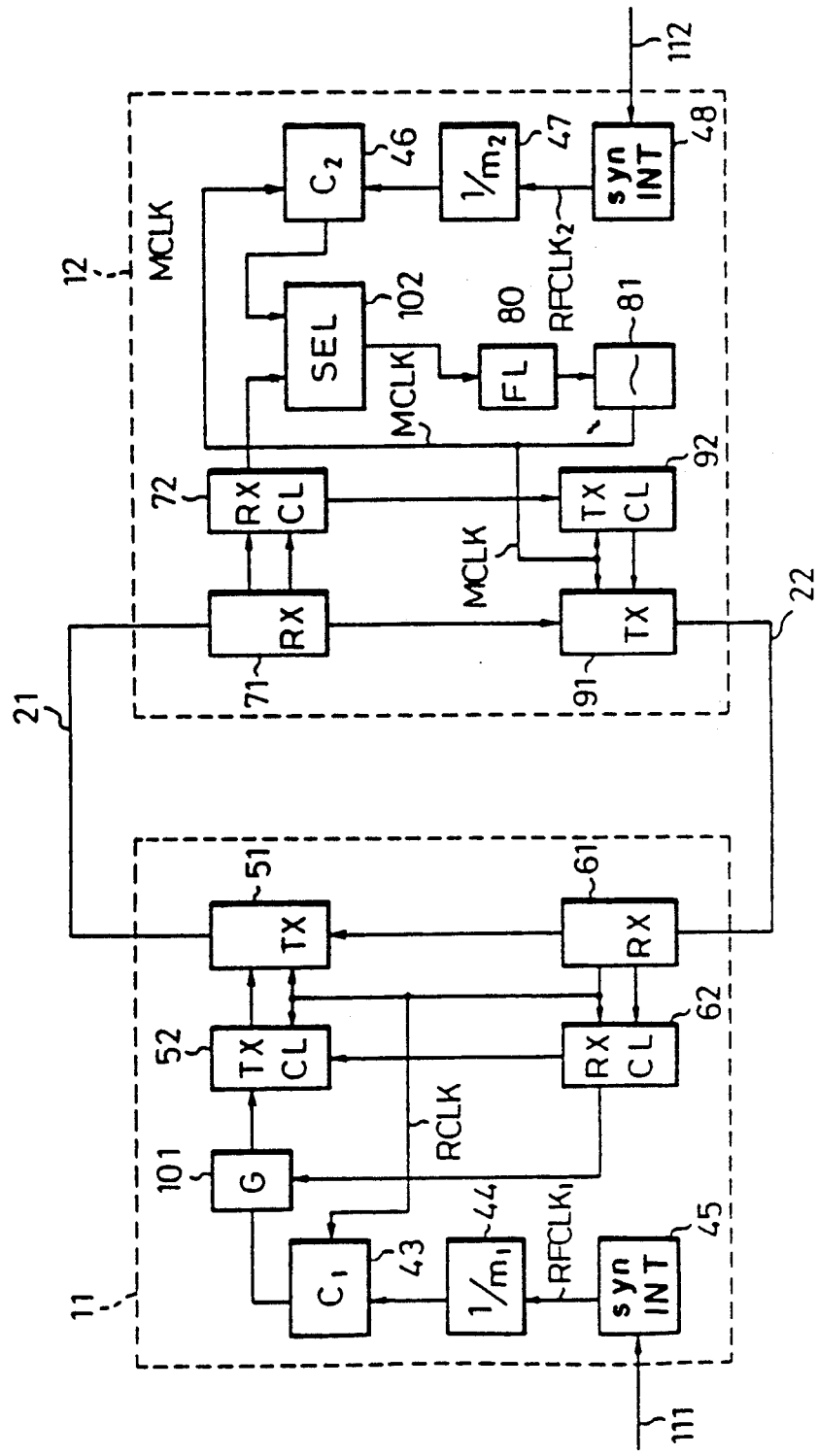

FIG. 5 shows another embodiment of the present invention.

In FIG. 5, reference numerals 21 and 22 each denote a transmission line, and 11 and 12 each denote a communication device. The communication devices 11 and 12 are connected to the transmission lines 21 and 22, and the transmission lines form a loop through which data is transmitted in the clockwise direction. The communication devices 11 and 12 each correspond to the aforementioned communication devices $1_1$ and $1_2$ in the construction of FIGS. 2 to 4.

In the construction of the communication device 11, 45 denots a synchronization interface circuit, 44 denotes a frequency dividing circuit, 43 denotes a counter, 101 denotes a gate circuit, 52 denotes a transmission control circuit, 51 denotes a transmission circuit, 62 denotes a receiving control circuit, and 61 denotes a receiving circuit.

In the construction of the communication device 12, which functions as a synchronization control device, reference numeral 48 denotes a synchronization interface circuit, 47 denotes a frequency dividing circuit, 46 denotes a counter, 102 denotes a selector, 80 denotes a filter circuit, 81 denotes a controlled oscillator circuit, 92 denotes a transmisssion control circuit, 91 denotes a transmission circuit, 72 denotes a receiving control circuit, and 71 denotes a receiving circuit.

The transmission circuit 51 in the communication device 11 and the receiving circuit 71 in the communication device 12 are connected by the transmission line 21, and the transmission circuit 91 in the communmication device 12 and the receiving circuit 61 in the communication device 11 are connected by the transmission line 22.

The above transmission lines 21 and 22 correspond to the aforementioned transmission line 2 in FIG. 2. Although, in practice, a plurality of other communication devices, each of which operates in synchronization with the same master clock supplied from the sysnchronization control device 12, are connected to the loop formed by the transmission lines 21 and 22 as shown in FIG. 1, but these are not shown in FIG. 5. The above construction is used, for example, in a distributed communication system in a company or in a factory.

In the construction of FIG. 5, the synchronization interface circuits 45 and 48 are provided respectively with a transmission line 111 and 112, each connecting the distributed communication system to the outside of system. The transmission lines 111 and 112 are each, for example, a public digital line, or a transmission line connecting the system with a terminal device. In the construction of FIG. 5, it is assumed that a reference clock in a normal state can be supplied to the system through at least one of the transmission lines 111 and 112. The synchronization interface circuits 45 and 48 each having a timing extracting circuit, and the reference clock can be extracted from the received data as a receiving clock.

The controlled oscillator circuit 81 provided in the communication device 12 outputs the above-mentioned master clock, where the master clock is controlled according to the output of the selector 102 applied through the filter circuit 80 to the controlled oscillator circuit 81 as a control input, so that the phase of the master clock is synchronized with the phase of the output of the selector 102. This portion corresponds to the construction of FIG. 4.

The master clock MCLK is used as a sending clock for synchronous data transmitted from the transmission circuit 91 under the control of the transmission control circuit 92 in the communication device 12, which is the synchronization control device. Therefore, the data transmitted from the transmission circuit 91 carries the information on the phase of the master clock MCLK, and thus the information on the phase of the master clock MCLK is supplied to all of the other communication devices in the distributed communication system.

When the above-mentioned reference clock in a normal state can be extracted at the synchronization interface circuit 48, the reference clock (shown by $RFCLK_2$ in FIG. 5) is frequency-divided in the frequency dividing circuit 47, and the phase of the reference clock $RFCLK_2$ is compared with the master clock MCLK from the controlled oscillator circuit 81 in a phase difference obtaining means realized by the counter 46, in a manner similar to the construction of FIG. 4. The output of the counter 46 is applied to the selector 102 as one input thereof. When the above-mentioned reference clock in a normal state can be extracted at the synchronization interface circuit 48, the selector 102 selects the output of the counter 46 and applies that output to the filter circuit 80.

When the above-mentioned reference clock in a normal state cannot be extracted at the synchronization interface circuit 48, and another reference clock (shown by $RFCLK_1$ in FIG. 5) can be extracted at the synchronization interface circuit 45 in the communication device 11, the reference clock $RFCLK_1$ is frequency-divided in the frequency dividing circuit 44, and the phase of the reference clock $RFCLK_1$ is compared with the master clock MCLK in a phase difference obtaining means realized by the counter 43, in a manner similar to the construction of FIG. 4. The master clock MCLK is output from the controlled oscialltor circuit 81, is transmitted from the transmission circuit 91 through the transmission line 22 as a timing of transmitting data, and is extracted as a receiving clock in the receiving circuit 61 at the communication device 11.

The output of the counter 43 is applied to the gate circuit 101. The gate circuit 101 is controlled so that the input of the gate circuit 101 can pass through only when a reference clock in a normal state cannot be extracted at the synchronization interface circuit 48, another reference clock (shown by $RFCLK_1$ in FIG. 5) can be extracted at the synchronization interface circuit 45 in the communication device 11, and a request for a transmission of a phase difference data from the communication device 12 is received in the receiving circuit 61 and the receiving control circuit 62. The gate circuit 101 is controlled as above by the receiving control circuit 62. For example, the information on whether or not a reference clock in a normal state can be extracted at the synchronizaton interface circuit 48 is transmitted from the transmission circuit 91 of the communication device 12 to the communication device 11, as data requesting a transmission of a phase difference.

The output of the counter 43 which passed through the selector 101, is output from the transmission circuit 51 to the transmissinon line 21 under the control of the transmission control circuit 62, as phase difference data. The phase difference data is received in the receiving circuit 71 of the communication device 12, is transformed into an output of a counter in the receiving control circuit 72, and is applied to the other input terminal of the selector 102.

When the reference clock $RFCLK_2$ in a normal state cannot be extracted at the synchronization interface circuit 48, and another reference clock $RFCLK_1$ can be extracted at the synchronization interface circuit 45 in the communication device 11, the selector 102 selects the above other input, and the output of the selector 102 is applied through the filter circuit 80 to the controlled oscillator circuit 81. Thus, the phase of the master clock MCLK output from the controlled oscillator circuit 81 is synchronized with the phase of the reference clock RFCLK$_1$ extracted by the synchronization interface circuit 45 in the communication device 11.

Therefore, in the distributed communication system having the construction as shown in FIG. 5, wherein a plurality of communication devices each have a function of extracting a reference clock through a transmission line which connects each of the communication devices with the outside of the distributed communication system, and each of the communication devices has a function of extracting a reference clock such as the above synchronization interface circuit, when the synchronization interface circuit comprised by the synchronization control device which generates the master clock cannot extract a reference clock in a normal state, another reference clock is extracted at a synchronization interface circuit in another communication device, the phase of the reference clock is compared with the master clock MCLK to obtain a phase difference in the communication device, the phase difference is transmitted from the communication device to the synchronization control device as data, and the synchronization control device uses the transmitted phase difference to control the phase of the master clock MCLK in its own controlled oscillator circuit. The synchronization control device comprises a selector for selecting the control input of the controlled oscillator circuit, from either the reference clock extracted at its own synchronization interface circuit and the other reference clock extracted at the other communication device.

Although, in the embodiments explained above, only one communication device operates as a synchronization control device which supplies the master clock MCLK to all of the other communication devices in the distributed communication system, in the aforementioned FDDI-II, each of the communication device in the distributed communication system has its own independent oscillator ans data is transmitted between the communication devices in a frame having a length of 125 µs, and all of the communication devices are operated in synchronization with the cycle of 125 µs supplied from one of the communication devices selected as a master station.

In the above system, as the FDDI-II, the above 125 µs timing obtained from frame data transmitted from the master station can be used as the master clock phase information in the embodiments of FIGS. 4 and 5. Namely, the present invention can be applied to a distributed communication system wherein each communication device in the system has its own independent oscillator, one of the communication devices output a periodical timing signal instead of the master clock, and all of the other communication devices operate in synchronization with the periodical timing signal.

To utilize the present invention in such a system, for example, after determining that one of the communication devices is a master station, at the timing of the initialization, the master station may select one of the communication devices as a communication device which extracts and supplies a reference clock. When the communication device selected as the supplier of the reference clock is not the master station itself, the master station may send a request for the data on the phase difference between the phase of the above periodical timing signal and the reference clock.

We claim:

1. A network synchronization system for synchronizing a master clock in a distributed communication system composed of a plurality of communication devices interconnected by one or more transmission lines, with a reference clock supplied from outside, wherein
    more than one communication device of said plurality of communication devices each comprises,
        a reference clock extracting means for extracting a clock from data transmitted from outside of said distributed communication system, and
        a phase difference obtaining means for obtaining a phase difference between said clock extracted in said reference clock extracting means in its own communication device and a master clock in said distributed communication system; and
    another communication device of said plurality of communication devices comprises,
        a second phase difference obtaining means for obtaining a second differecne between a second reference clock and a master clock in said another communication device,
        a selecting means for receiving outputs of the phase difference obtaining means in said more than one communication devices through transmission lines connecting said more than one communication devices and said second phase difference obtaining means, and selecting and outputting one of said outputs of the phase difference obtaining means, and
        a controlled oscillator means for receiving the output of said selecting means, and outputting said master clock having a phase which is controlled according to said output of the selecting means so that the phase of the master clock is synchronized with the phase of the clock corresponding to the output selected in the selecting means.

2. A network synchronization system for synchronizing a master clock in a distributed communication system comprising a plurality of communication devices interconnected by one or more transmission lines, with a reference clock supplied from outside, wherein
    first and second reference clocks are each supplied from outside of said distributed communication system to first and second communication devices among said plurality of communication devices, respectively;
    said first communication device comprises first reference clock extracting means, first phase difference obtaining means, master clock phase information extracting means, and first data transmitting means; and
    said second communication device comprises controlled oscillator means, second reference clock extracting means, second phase difference obtaining means, data recieving means, second data transmitting means, and selecting means;
    said controlled oscillator means outputs a master clock which gives a referential timing for synchronous operations in said plurality of communication devices, according to an output of said selecting means;
    said first data transmitting means transmits data synchronized with the master clock through one of said transmission lines to said second communication device;

said master clock phase information extracting means extracts phase information of the master clock from data transmitted from said second data transmitting means;

said first and second reference clock extracting means each extract the first and second reference clocks, respectively;

said first phase difference obtaining means a first phase difference between the first reference clock and the master clock, and said second phase difference obtaining means obtains a second phase difference between the second reference clock and the master clock;

said first data transmitting means transmits the first phase difference through one of said transmission lines to said data receiving means in said second communication device in a form of data;

said selecting means receives the first phase difference received in said data receiving means, and the second phase difference from said second phase difference obtaining means, and selectively provides as the output one of the first and second phase difference to said controlled oscillator means; and said controlled oscillator is controlled according to the phase difference selected in said selecting means so that the phase of the master clock is synchronized with the phase of one of the first and second reference clocks corresponding to the output selected in the selecting means.

3. A network synchronization system for synchronizing a master clock in a distributed communication system comprising a plurality of communication devices interconnected by one or more transmission lines, with a reference clock supplied from outside of the distributed communication system, said system comprising:

a first one of said communication devices includes,
means for receiving data from outside of the distributed communication system,
reference clock extracting means for extracting a clock from the data, and
phase difference obtaining means for providing an output responsive to a phase difference between the clock extracted in said reference clock extracting means in its own communication device and the master clock in the distributed communication system; and a second one of said communication devices includes,
receiving means for receiving the output of said phase difference obtaining means in said first communication device through one of the transmission lines connnecting said first communication device and said second communication device, and
controlled oscillator means for receiving the output of said phase difference obtaining means in said first communication device through one of the transmission lines connecting said first communication device and said second communication device, and for providing the master clock having a phase which is controlled according to the output of said phase difference obtaining means so that the phase of the master clock is synchronized with the phase of the reference clock.

4. A network sychronization system for synchronizing a master clock in a distributed communication system comprising a plurality of communication devices interconnected by one or more transmission lines, with a reference clock supplied from outside of the distributed communication system, said system comprising:

a first one of said communication devices includes,
reference clock extracting means for extracting the reference clock,
phase difference obtaining means for obtaining a phase difference between the reference clock and the master clock,
first data transmitting means for providing first data including the phase difference through one of the transmission lines, and
master clock phase information extracting means for extracting phase information of the master clock from second data; and a second one of said communication devices includes,
controlled oscillator means for synchronizing the master clock according to the phase difference of the reference clock and for providing the master clock,
data receiving means for receiving the first data through the transmission line, and
second data transmitting means for transmitting the second data synchronized with the master clock through one of said transmission lines to said first communication device.

* * * * *

UNITED STATES PATENT AND TRADEMARK OFFICE
CERTIFICATE OF CORRECTION

PATENT NO. : 5,062,124
DATED : October 29, 1991
INVENTOR(S) : Shigerhiro HAYASHI et al.

It is certified that error appears in the above-identified patent and that said Letters Patent is hereby corrected as shown below:

Column 5, line 21, after "phase" insert

--difference--.

Column 9, line 44, change "ans" to --and--.

Column 11, line 10, after "means" insert

--obtains--.

Signed and Sealed this

Twenty-third Day of February, 1993

*Attest:*

STEPHEN G. KUNIN

*Attesting Officer*     *Acting Commissioner of Patents and Trademarks*